United States Patent [19]

Deberry et al.

[11] Patent Number: 5,705,135
[45] Date of Patent: Jan. 6, 1998

[54] COMPOSITION AND PROCESS FOR THE REMOVAL OF HYDROGEN SULFIDE FROM GASEOUS STREAMS

[75] Inventors: David W. Deberry; Timothy W. Trofe, both of Austin, Tex.

[73] Assignee: Gas Research Institute, Chicago, Ill.

[21] Appl. No.: 510,441

[22] Filed: Aug. 2, 1995

Related U.S. Application Data

[63] Continuation-in-part of Ser. No. 147,749, Nov. 4, 1993, abandoned.

[51] Int. Cl.$^6$ .................................................. C01B 17/16
[52] U.S. Cl. ........................ 423/224; 423/220; 423/226; 423/242.1; 423/242.2
[58] Field of Search .................................. 423/220, 224, 423/226, 242.1, 242.2, 243.01, 243.07, 242.7

[56] References Cited

U.S. PATENT DOCUMENTS

| | | | |
|---|---|---|---|
| 3,622,273 | 11/1971 | Roberts et al. | 423/576.6 |
| 3,676,356 | 7/1972 | Roberts et al. | 252/192 |
| 3,767,766 | 10/1973 | Tjoa et al. | 423/220 |
| 3,911,080 | 10/1975 | Mehl et al. | 423/220 |
| 3,956,473 | 5/1976 | Mimoun et al. | 423/573.1 |
| 4,020,149 | 4/1977 | Bosniack | 423/575 |
| 4,049,776 | 9/1977 | Nicklin et al. | 423/576.6 |
| 4,436,711 | 3/1984 | Olson | 423/576.6 |
| 4,515,759 | 5/1985 | Burnes et al. | 423/220 |
| 4,518,576 | 5/1985 | Diaz | 423/576.6 |
| 4,539,189 | 9/1985 | Starkston et al. | 423/220 |
| 4,647,397 | 3/1987 | Starkston et al. | 252/189 |
| 4,649,032 | 3/1987 | Snavely, Jr. et al. | 423/226 |
| 4,654,202 | 3/1987 | Walker | 423/220 |
| 4,666,695 | 5/1987 | Baur et al. | 423/571 |
| 4,758,416 | 7/1988 | Fong et al. | 423/226 |
| 4,859,437 | 8/1989 | Grinstead | 423/226 |
| 4,889,700 | 12/1989 | Elgue et al. | 423/220 |
| 4,892,718 | 1/1990 | Peter et al. | 423/235 |
| 4,931,262 | 6/1990 | Sonta et al. | 423/220 |
| 5,122,351 | 6/1992 | Hardison | 423/220 |
| 5,126,118 | 6/1992 | Hardison | 423/220 |
| 5,139,753 | 8/1992 | Hardison | 423/220 |
| 5,352,422 | 10/1994 | van den Brink et al. | 423/224 |
| 5,422,086 | 6/1995 | Bowman | 423/220 |
| 5,500,135 | 3/1996 | Smith et al. | 210/787 |

OTHER PUBLICATIONS

U.S. Environmental Protection Agency, SO$_2$ Emissions in Natural Gas Production Industry Background Information for Proposed Standards, EPA-450/3-82-023a, Research Triangle Park, North Carolina, Nov., 1983.

Oil and Gas Journal, "Worldwide Gas Processing Survey," Jul. 10, 1989.

Dalrymple et al., 1929, Environ. Progess, pp. 217-222.

"Formation of Lithium Polysulfides in Aprotic Media," by R.D. Rauh, F.S. Shuker, J.M. Marston, and S.B. Brummer, J. Inorg. Nucl. Chem., 1977, vol. 39, pp. 1761-1766.

Hodes et al., 1980, J. Electrochem. Soc. 127:544.

Primary Examiner—Joseph D. Anthony
Attorney, Agent, or Firm—Speckman, Pauley & Fejer

[57] ABSTRACT

A method and apparatus for the removal of hydrogen sulfide (H$_2$S) from gaseous streams, particularly concentrations of H$_2$S lower than 100 ppm. The invention is particularly useful for removing H$_2$S from natural gas. The invention involves contacting a gaseous stream containing hydrogen sulfide with a sorbent solution comprising a substantially non-aqueous solvent having a low vapor pressure and a high donor number, such as dimethyl sulfoxide, a concentration of a polyvalent reducible metal ion in an oxidative state sufficient to oxidize the hydrogen sulfide to form at least one soluble sulfur compound, such as Fe$^{3+}$, and a counter-ion for the metal ion, such as Cl$^-$; and regenerating the oxidative state of the metal ion reduced by the hydrogen sulfide.

29 Claims, 9 Drawing Sheets

COMPOSITION AND PROCESS FOR THE REMOVAL OF HYDROGEN SULFIDE FROM GASEOUS STREAMS

CROSS REFERENCED TO RELATED APPLICATION

This application is a continuation-in-part application of our U.S. patent application having Ser. No. 08/147,749 and a Filing Date of 04 Nov. 1993 now abandoned.

BACKGROUND OF THE INVENTION

1. Field of the Invention

The present invention relates to the removal of hydrogen sulfide ($H_2S$) from gaseous streams, particularly concentrations of $H_2S$ lower than 100 ppm. The invention is particularly useful for removing $H_2S$ from natural gas.

2. Description of Prior Art

The natural gas industry has preferred to produce those gas streams that were relatively large in volume and low in $H_2S$ and $CO_2$ content, since these streams have lower drilling and treatment costs. Historically, however, 25 percent of the natural gas produced in the Untied States has been sour, i.e., containing greater than 5.7 mg $H_2S/M^3$ (0.25 g/100 standard cubic feet [SCF]) (U.S. Environmental Protection Agency, $SO_2$ Emissions in Natural Gas Production Industry Background Information for Proposed Standards, EPA-450/3-82-023a, Research Triangle Park, N.C., November, 1983). The traditional approach for treating this sour gas has been amine treatment, with the acid gases vented to the atmosphere or routed to a flare in the case of small, low-$H_2S$ streams. However, flaring or venting of the sulfur in these streams is becoming less and less environmentally acceptable.

If the gas stream has been large so that the amount of sulfur is significant (greater than 5-10 megagrams (5-10 long tons) per day), a Claus unit has typically been added to recover sulfur from the acid gas. As these large, easily recoverable streams are depleted, the industry will begin to produce streams that are smaller in flow, have a higher $H_2S$ content, and fluctuate in flow and composition. Based on Jan. 1, 1989 natural gas production data for the United States (Oil and Gas Journal, "Worldwide Gas Processing Survey," Jul. 10, 1989), sour gas production is projected to increase and reach 85–170 billion cubic meters (3–6 trillion SCF) per year by 2000.

It has been estimated that 80 percent of the sour gas in the survey contained less than one percent $H_2S$. Thus, it is probable that low-$H_2S$, low-$CO_2$ gas represents a substantial portion of current subquality natural gas production. For example, one segment of subquality natural gas production is gas containing 100–8000 ppm $H_2S$ and less than 3 percent $CO_2$. This segment represented a daily 1throughout of 111 million $m^3$ (3.94 billion SCF), or 10.4 percent of all gas produced. This segment represented 43 percent of all sour gas production. Based on a value of $1.90/gigajoule ($2/ million Btu), the value of this gas is approximately $3.1 billion per year. It is anticipated that this segment will grow as sweet reserved are depleted. Removal of hydrogen sulfide from gas streams containing low concentrations of $H_2S$ is necessary in many industries in addition to the natural gas industry. Present processes for scavenging $H_2S$ from such streams (typically of 0.1 ton/day sulfur content) have a number of drawbacks. Processes based on scrubbing $H_2S$ with aqueous nitrite are not regenerable, and produce an aqueous waste stream containing ammonia and possibly dangerous nitroso compounds. The various supported iron oxide processes are also not regenerable, and produce a bulky solid waste that must be disposed of. The traditional approaches for treating natural gas have environmental, performance, and economic limitations for handling these small, fluctuating streams with less than one percent $H_2S$. Venting or flaring of sulfur will become less and less acceptable as sulfur regulations tighten. The $H_2S$ removal efficiency of the Claus process declines at low loads or during upsets that may be caused by the fluctuating gas composition. The Claus process also tends to produce carbon sulfur gases when operating at less-than-design throughput. Amine/Claus systems are also costly for small streams with low $H_2S$ concentrations.

Liquid redox processes represent a relatively new class of regenerable processes for $H_2S$ removal and offer several technical economic advantages for removing $H_2S$ from a gas stream. Liquid redox sulfur recovery processes absorb $H_2S$ from gas streams and produce sulfur for sale or disposal. These processes utilize regenerable liquid catalysts as oxidizing agents to convert $H_2S$ to elemental sulfur, and the reduced catalyst species are typically reoxidized in the presence of air. The processes can be used in a variety of desulfurization applications in the natural gas industry, including direct treatment of natural gas and treatment of off-gas from acid gas removal process, Claus plant tail gas, and coal-derived (substitute) natural gas (Dalrymple et al., 1929, Environ. Progress, pp. 217–222).

However, the sulfur handling requirements required for the current liquid redox processes, such as the Stretford and LO-CAT® process, add complexity which restricts their usefulness to larger installations, i.e., installations that produce on the order of 1 ton/day or more of sulfur. Normal liquid redox processes also have a large footprint since the aeration tanks are large, and several vessels are required in addition to the scrubber.

The disclosures of U.S. Pat. No. 3,622,273, issued Nov. 23, 1971 and U.S. Pat. No. 3,676,356, issued Jul. 11, 1972, both to Roberts et al., concern the removal of hydrogen sulfide from waste gases, such as stack gases. The hydrogen sulfide content is very high, for example as high as 1,000 ppm in stack gases. A key aspect is that one desires to and does oxidize the hydrogen sulfide to solid elemental sulfur, which is then recovered from the solution. A drawback of such a system is that the solid sulfur must be continuously filtered.

The present invention seeks to overcome the disadvantages of the prior methods for removing $H_2S$ from a gas stream.

SUMMARY OF THE INVENTION

Thus, it is an object of the present invention to remove relatively low or variable concentrations of $H_2S$ from a gas stream.

It is a further object of the present invention to remove $H_2S$ from a gas stream in an ecologically prudent manner. In particular, the invention seeks to scrub $H_2S$ without venting or flaring sulfur, or generating solid waste, ammonia or dangerous nitrous compounds, and without producing a significant amount of sulfur as a solid at the point of treatment.

Yet another object of the invention is to provide a regenerable absorbent for $H_2S$ removal from a gas stream.

Still a further object of the invention is to provide for removing $H_2S$ from a gas stream with a minimal equipment footprint at small and large installations.

The present invention provides a composition and method for removing $H_2S$ gas from a gaseous stream, and an apparatus for practicing the method. Thus, in one aspect, the present invention relates to a method for removing hydrogen sulfide from a gaseous stream. The method involves contacting a gaseous stream containing hydrogen sulfide with a sorbent solution, which sorbent solution comprises a substantially non-aqueous solvent having a low vapor pressure and a high donor number, a concentration of a polyvalent reducible metal ion in an oxidative state sufficient to oxidize the hydrogen sulfide, and a counter-ion for the metal ion, forming at least one soluble sulfur compound; and regenerating the oxidative state of the metal ion reduced by the hydrogen sulfide, whereby said at least one soluble sulfur compound remains soluble during and subsequent to said regeneration. Preferably, the sorbent is not contacted by air.

In another aspect, the present invention relates to a composition, i.e., sorbent solution, useful for removing hydrogen sulfide from a gaseous stream. Such a composition comprises a substantially non-aqueous solvent having a low vapor pressure and a high donor number, a concentration of a polyvalent reducible metal ion in an oxidative state sufficient to oxidize hydrogen sulfide in a gaseous stream, a counter-ion for the metal ion, and a gaseous stream containing hydrogen sulfide.

In a further aspect, the invention relates to an apparatus for removing hydrogen sulfide from a gaseous stream. The apparatus includes a vessel containing a sorbent solution as described above. The vessel further includes means for contacting a gas stream with the sorbent solution in the vessel and means for regenerating the oxidative state of the metal ion reduced by the hydrogen sulfide.

In specific aspects of the invention, the gaseous stream preferably contains less than about 100 parts per million (ppm) of hydrogen sulfide, and may contain less than 50 ppm of $H_2S$; preferably the gaseous stream is natural gas.

In accordance with a preferred embodiment, the non-aqueous solvent is dimethylsulfoxide. The metal ion is selected from the group consisting of iron, manganese, copper, cobalt, and vanadium; preferably, the metal ion is iron. In another embodiment, the metal ion is coordinate bonded with a chelating group. Preferably the chelating group (chelating agent) is an aminopolycarboxylate. In a specific embodiment, the chelating group may be selected from the group consisting of ethylenediamine-N,N,N',N'-tetraacetate (EDTA), diethylenetriaminepentaacetate (DTPA), N-(2-hydroxyethyl)ethylenediamine-N,N',N'-triacetate (HEDTA), ethylene bis(oxyethylenenitrilo) tetraacetate (EGTA), trans-1,2-cyclohexanediaminetetraacetate (CDTA), and nitrilotriacetic acid (NTA). Preferably, the counter-ion is a halide; more preferably the counter-ion is chloride.

In accordance with one embodiment of this invention, the oxidative state of the metal ion is regenerated electrochemically. Preferably, the electrolysis is conducted in situ, although the invention contemplates pumping the sorbent solution to an external electrochemical cell to regenerate the metal ion. In accordance with another embodiment, the oxidative state of the metal ion is regenerated by chemical oxidation. In accordance with one preferred embodiment, the chemical oxidation is effected by treatment with a 2:1 stoichiometric ratio of concentrated hydrogen peroxide to reduced metal ion. In yet another embodiment, the oxidative state of the metal ion is regenerated by contacting the sorbent solution with an oxidizing solid. One example of a suitable oxidizing solid is polyaniline.

In accordance with one preferred embodiment, hydrogen is removed from the sorbent solution concurrently with the regeneration of the oxidative state of the metal ion. When the sorbent solution reaches saturation or near saturation level with polysulfides that are produced by oxidation of hydrogen sulfide, the entire sorbent solution is regenerated by precipitating the polysulfides to recover elemental sulfur. So treated, the sorbent solution can be reused to scrub $H_2S$ from a gaseous stream as described above.

The advantages of the present invention are readily apparent to the ordinary skilled artisan. The improvements expected for the sorbent solution of the invention are its regenerability, the lack of solid product during the sorption step, and production of an environmentally benign product (solid sulfur). In contrast, present scavenging processes are not regenerable, often produce byproducts which cause maintenance or environmental problems, and create wastes, the disposal of which is often difficult.

A parameter which is commonly used to compare the solubility of sulfur in scavenging or scrubbing solutions is to express that solubility as lb $H_2S$ per gallon of solution (lb $H_2S$/gal). Sodium nitrite solutions, the most common scavenging solution in use today, have a capacity from 1.1 to 1.7 lb $H_2S$/gal., while amine-based scavengers hold 0.6–1.5 lb $H_2S$/gal. Aldehydes and formaldehydes also hold 0.6–1.5 lb $H_2S$/gal. Sodium hydroxide solution has a capacity of 0.6 lb $H_2S$/gal. By contrast, DMSO has a theoretical capacity of 2.88 lb $H_2S$/gal. This indicates a significant capacity advantage of the present invention over the prior methods.

The present invention, while making use of many of the same reactants as the prior art, in specific aspects including ferric chloride and the organic solvent DMSO, differs from the prior art in quite important and advantageous details, as noted above. In a particular aspect, the present invention concerns a scavenging process. The gases which are to be purified of $H_2S$ in the present process may contain a very low content of $H_2S$, e.g., of the order of 20 to 50 ppm. This level of concentration can be found, for example, in natural gas. The invention provides for removing the $H_2S$ or dropping it to 4 ppm or less in order to meet standards deemed appropriate for pipeline transmission to limit corrosion effects. This contrasts to much of the prior art, where very high content $H_2S$ flue gases or the like are under consideration, and where removal of $H_2S$ present in a gaseous stream at low concentration proceeds inefficiently.

In further contrast to the prior art methods, the present invention avoids precipitating sulfur at the point of treatment. In an advantageous aspect, the invention provides a tank or other vessel at a field point—for example at a wellhead—for treating the gas stream at such point for a very extended period to remove or severely cut the hydrogen sulfide content. Since the treatment procedure occurs without precipitating elemental sulfur in the treatment tank or reservoir, the invention advantageously lowers the complexity and the cost of removing or scavenging hydrogen sulfide from a gas stream. If elemental sulfur were precipitated in the sorbent solution, as taught in much of the prior art, it would be contrary to the purposes of the present invention, in that the sulfur would clog the reservoir. The invention provides for maintaining the DMSO reservoir containing dissolved sulfur, hypothesized to be in the form of polysulfides, for extended periods, as for example 3 or 4 months, after which the reservoir is treated either at the field location or at a remote location to regenerate the solution by removing sulfur before it reaches the point of instability. Thus, it is only at the time of regeneration treatment that the sulfur is actually precipitated and removed.

DESCRIPTION OF PREFERRED EMBODIMENTS

Figure 1:
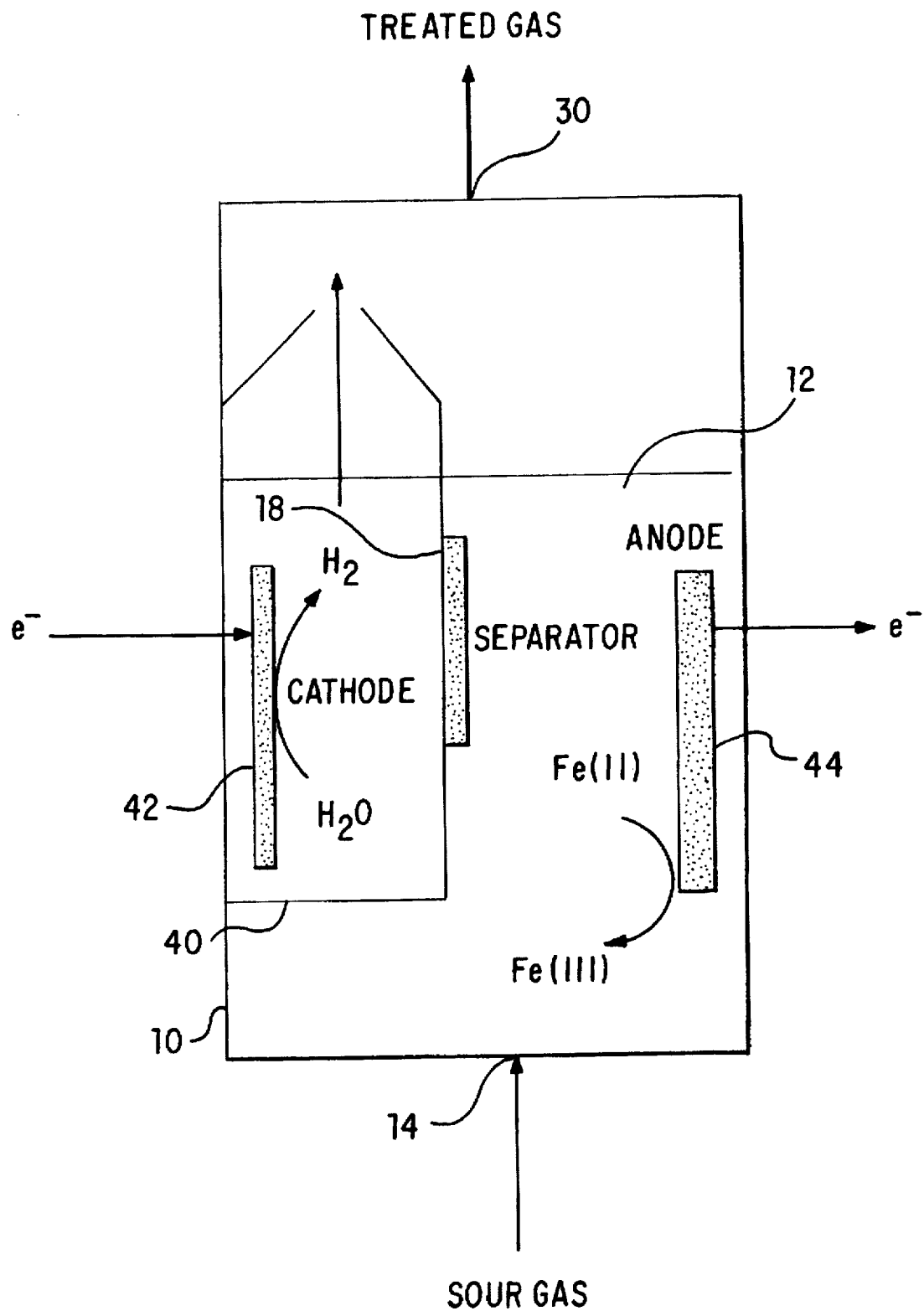
FIG. 1 is a schematic diagram of an aspect of the invention in which electrochemical regeneration of $Fe^{3+}$ from $Fe^{2+}$ is conducted in situ.

It has been discovered that a solution of a multivalent transition metal ion having a correct oxidation state in a non-aqueous solvent, preferably a solvent having a low vapor pressure and high donor number, provides a regenerable redox system for scrubbing gas and removing large amounts of $H_2S$ from the gas before the elemental sulfur needs to be precipitated to regenerate the solvent. Thus, the present invention provides a composition and a method for removing $H_2S$ gas from a gaseous stream. Accordingly, the following terms are used to describe the invention.

As used herein, the terms "remove", "scavenge" and "scrub" all refer to the purifying a gaseous stream by decreasing the concentration of hydrogen sulfide in the stream. The term "scavenge" refers particularly to the removal of a low concentration of $H_2S$ from a gaseous stream.

As used herein, the term "sorbent" refers to a solution that is capable of removing $H_2S$ from a gaseous stream by oxidizing the $H_2S$ to form soluble sulfur compounds, for example polysulfides which are dissolved in the sorbent. Preferably, the sorbent has a theoretical capacity of greater than 1.7 lb $H_2S$/gal., and more preferably the sorbent has a theoretical capacity of greater than 2 lb $H_2S$/gal. Thus, the method of this invention oxidizes the $H_2S$ to form more than an insignificant or incidental amount of soluble sulfur compounds. The formation of soluble sulfur compounds by oxidation of the $H_2S$ which remains in soluble form throughout the various stages of the method of this invention is a critical feature of this invention.

As used herein, the term "non-aqueous" refers to a solvent substantially lacking water. Preferably, the non-aqueous solvent of the invention has a high donor number, i.e., greater activity as a Lewis base. It is also preferred that the solvent have a low vapor pressure. The term "substantially non-aqueous" indicates that the solvent may contain some dissolved water in an amount insufficient to significantly decrease the solubility of polysulfides in the solvent. The amount of water in the substantially non-aqueous solvent is less than 1%, when the percentage is calculated by weight/volume (wt/v).

As used herein, the term "polyvalent reducible metal ion" refers to a metal ion, such as a transition metal ion, that can change valency and has the oxidation state at level that is able to oxidize $H_2S$. Thus, the metal ion acts as an "oxidant" according to the present invention. For example, if the metal is a transition metal such as iron, cobalt, manganese or copper, it is an oxidant in the +3 valence state, and can be reduced (with the oxidation of $H_2S$) to the +2 valence state. In a preferred embodiment, the metal is ferric ($Fe^{3+}$) ion, which can be reduced to ferrous ($Fe^{2+}$) ion in the oxidation of $H_2S$. In another embodiment, the metal is vanadium in the +5 valence state, which is reduced to vanadium in the +4 valence state. Other redox systems known in the art can be used. The invention further provides that a metal ion may be coordinate bonded to a chelating agent, which can stabilize the metal.

As is well known in the art, convention provides that the valence state of metal ions can be indicated by roman numbers in parentheses, e.g., ferric ion is Fe(III), and ferrous ion is Fe(II). Both conventions may be used herein.

The invention replaces the current aqueous scrubbing solution of the present liquid redox scrubbers with a non-aqueous scrubbing system that adapts it to the needs of scavenging applications. During normal operation of the new process scrubbing system of the invention, the absorbed $H_2S$ is oxidized to soluble compounds, believed to be polysulfides, that can remain dissolved in the process at high concentrations for a sustained period.

Periodically, the used solution can be further processed to produce solid sulfur and regenerate the solution for further use. This processing can be done either at a central site serving a number of different scrubbers, or by a mobile processing unit. Generally, addition of water or acid to the sorbent solution containing dissolved sulfides will precipitate elemental sulfur. The solution can be filtered to remove the solids, then used again as a scrubbing or scavenging sorbent.

As pointed out above, the invention uses an inorganic oxidant in an organic, nonaqueous solvent that has a high capacity for polysulfides. Preferably, the inorganic oxidant is a multivalent metal ion. The inorganic nature of the oxidant can eliminate oxidant degradation problems and the need for frequent chemical additions. The oxidant is preferably present at the highest stable concentration possible in the solvent to provide the maximum redox potential without precipitating from solution. However, the oxidant may be present in lower than optimal concentrations, if this is desired.

In a further embodiment, a chelating agent can be used to stabilize the metal ion. Generally, preferred chelating agents are aminopolycarboxylates. For example, but not by way of limitation, the chelating agent can be ethylenediamine-N,N, N',Nl-tetraacetate (EDTA), diethylenetriaminepentaacetate (DTPA), N-(2-hydroxyethyl)ethylenediamine-N,N',N'-triacetate (HEDTA), ethylene bis(oxyethylenenitrilo) tetraacetate (EGTA), trans-1,2-cyclohexanediaminetetraacetate (CDTA), or nitrilotriacetic acid (NTA), to name but a few chelators. The sorbent itself is preferably not contacted by air. This should also increase stability, as there will be no chance for highly reactive hydroxyl radicals to be formed.

Certain properties of the nonaqueous solvent have a profound effect on the polysulfide chain length and solubility. Some general rules appear to be as follows: Solvents having high dielectric constant and high donor number show high polysulfide solubility and stabilize low order (short chain) polysulfides. Solvents having low dielectric constant and high donor number give a high solubility for longer chain polysulfides. Solvents of low donor number show low solubility for polysulfides. Organic (non-aqueous) solvents with a high donor number are preferred. Any organic solvent with the desired properties of dielectric constant, vapor pressure and donor number can be used.

The solvent preferably is dimethyl sulfoxide (DMSO). This is a chemical of commerce, relatively inexpensive, and has the chemical and physical properties needed. It has a low vapor pressure (boiling point 189° C.), a very high donor number, and moderate dielectric constant. Polysulfide is quite soluble in DMSO. One report states the solubility as 10 gmole S/L, the polysulfide being predominately in the $S_9$ form ("Formation of Lithium Polysulfides in Aprotic Media," by R. D. Rauh, F. S. Shuker, J. M. Marston, and S. B. Brummer, *J. Inorg. Nucl. Chem.*, 1977, Vol. 39, pp. 1761–1766).

Taking as an example a facility processing 20 million standard cubic feet per day (MMSCFD) of gas containing 20 ppm $H_2S$, it would take 120 days to reach the solubility limit in 1000 gallon of solvent, assuming that the solubility of polysulfide is the only limit on the solvent capacity. However, the oxidizing and acid/base properties of the system must also be considered.

It is likely that ferric ion is mainly bound as the tetrachloro complex in DMSO, particularly in the presence of excess chloride. Thus the likely overall sorption reaction can be written:

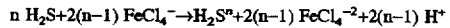

$$n\ H_2S + 2(n-1)\ FeCl_4^- \rightarrow H_2S^n + 2(n-1)\ FeCl_4^{-2} + 2(n-1)\ H^+$$

The solubility of sulfur as polysulfide in DMSO is approximately ten times that of ferric ion. Therefore, the capacity of the sorbent would be limited by the oxidizing agent if the ferrous ion is not continuously converted back to ferric ion. In a specific example, infra, the redox couple had a turnover ratio of approximately 45, i.e., the sorbent absorbed 45 times more $H_2S$ with electrochemical regeneration of the ferric ion than it would have based only on the original FE(III) concentration.

In addition, the production of hydrogen ion, i.e., acid, could ultimately limit the capacity or disturb the chemistry of the sorbent if it is not controlled. The invention provides several promising methods for continuously regenerating the redox agent and removing the acidity.

The invention further provides an apparatus for scrubbing a gas stream. Generally, the apparatus comprises at least of a vessel containing the sorbent solution. Means for contacting a gas stream with the sorbent solution are also provided. Such means are well known in the art, and will generally involve an inlet to the sorbent solution in the vessel from some gas source. Preferably, the gas is bubbled or otherwise dispersed in the sorbent solution to provide for maximum contact and absorption. The vessel will also have an outlet for the scrubbed gas. Usually, there will be space for gas to collect in the vessel above the sorbent solution before it exits the vessel. The gas stream may enter and exit the vessel by pumping or evacuation, respectively, or under its own pressure.

Figure 2:
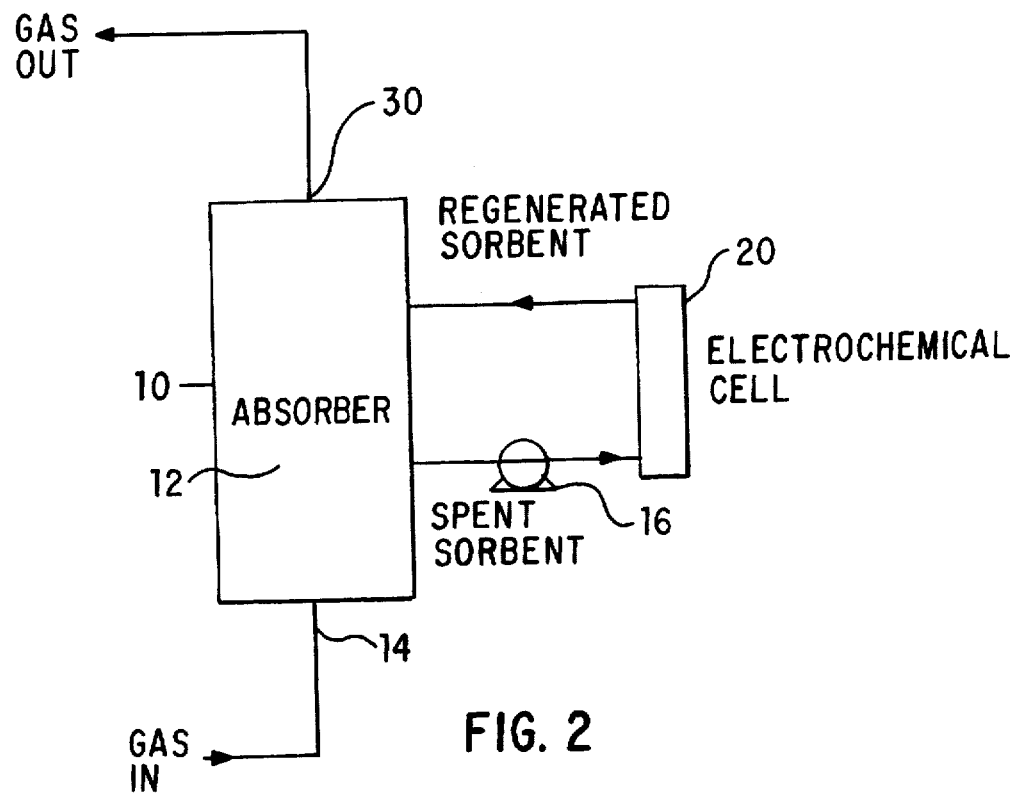
FIG. 2 is a schematic diagram of an aspect of the invention in which the spent sorbent solution is pumped into an electrochemical cell to regenerate (oxidize) the metal ion for further oxidation of $H_2S$ (and reduction of the metal ion).

In one embodiment, the regeneration method is electrochemical reoxidation of the oxidant, e.g., the tetrachloroferrous ion to the tetrachloroferrate ion. This is a facile electrochemical oxidation in DMSO. In a specific embodiment, regeneration can be accomplished using simple graphite electrodes situated in the sorbent vessel, i.e., in situ or in scrubber. A schematic diagram of in situ regeneration is shown in FIG. 1, in which the sorbent vessel 10 containing sorbent solution 12 contains an electrochemical regeneration system. The gas stream enters the vessel through an inlet 14, and exits through an outlet 30. The cathode 42 is placed in a separate compartment 40 to avoid inefficiency resulting from reduction of the newly oxidized redox couple on the cathode. The cathode compartment can be operated with an aqueous solvent such that the main reaction is electrolysis of water to generate hydrogen, which can be combined with the exit gas stream, particularly if a natural gas stream is being scrubbed. The cathode can be platinum, graphite, stainless steel, or the like. A separator 18, which provides for conductance, separates the cathode from the sorbent solution. In one embodiment, the separator is a glass frit. A membrane can also be used as a separator. The anode 44 is found in the sorbent solution. The anode is preferably graphite. Alternatively, the sorbent solution can be pumped to a separate electrochemical cell for regeneration of the oxidant. A schematic diagram of this embodiment of the invention is given in FIG. 2. A gaseous stream enters the sorbent vessel 10 containing the sorbent solution 12 through an inlet 14. The reduced metal ion formed as a result of oxidation of the $H_2S$ contained in the gaseous stream yields "spent" sorbent, which is transferred with a high pressure pump 16 to an electrochemical cell 20. The regenerated sorbent returns to the vessel 10. Scrubbed gas leaves the vessel through an outlet 30.

Figure 3:
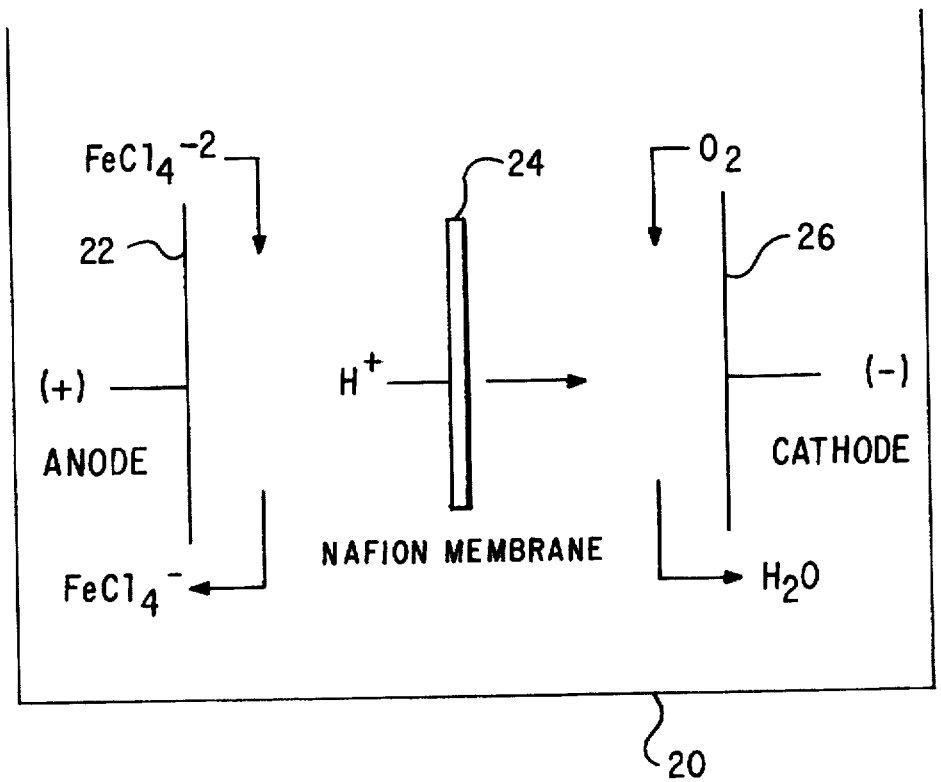
FIG. 3 is a schematic diagram of the electrochemical cell of FIG. 2, in which a cation selective membrane provides for selective migration of hydrogen ion, which is reduced to form water, and the oxidation of ferrous chloride ($FeCl_4^{-2}$) to ferric chloride ($FeCl_4^-$) to regenerate the absorbent.

Referring now to FIG. 3, an expanded view of the electrochemical cell 20, it is possible to combine the oxidant regeneration operation with the removal of hydrogen ions using a cation selective membrane 24. This is attractive since the same electrical current used to regenerate the iron species at the anode 22 can also serve to transport the hydrogen ion across the membrane to the cathode 26. If the overall sorption reaction occurs as given above, the regeneration and ion transport currents will be exactly balanced since equimolar amounts of $FeCl_4^-$ and $H^+$ are involved.

Such an external electrochemical cell can be quite small. Based on the above example and a conservative estimate of 20 amp/ft$^2$, two cell modules, each one approximately 1 ft×0.5 ft in size, would be sufficient. Aerated DMSO is used on the anodic side of the cell. Oxygen has a relatively high solubility in DMSO, increasing the efficiency of the air electrode. The use of a similar solution, i.e., DMSO, on both sides of the membrane will decrease stress on the membrane due to osmotic and salvation differentials. Hydrogen ions transported across the cation selective membrane will be consumed by the cathodic reduction of oxygen.

$$O_2(DMSO)+4e^-+4H^+\rightarrow 2H_2O$$

The water that is formed in this process can be substantially isolated from the sorbent solution by the selective membrane. Although it will probably be necessary to clean the cells and membranes periodically, this could probably be done at the same intervals as the overall solution regeneration.

The electrical requirements for this process can be estimated. The actual power requirements can be resolved easily by bench scale experiments. The rate of production of N gmoles of FeCl$_4^-$ can be expressed in terms of the total current, I, the current efficiency, e, and the Faraday constant, F.

$$\frac{dN}{dt}=\frac{eI}{F}$$

For the example above, given a gas stream of 20 MMSCFD containing 20 ppm H$_2$S, the current required would be 392 amperes, assuming a current efficiency of 90%. The current used in practice can be substantially reduced by using bipolar cells, at the cost of higher operating voltage. The inherent operating voltage is a function of many variables. Using a conservative value of 2 volts, the estimated operating power for regeneration of this example system would be 780 watts, exclusively of pumping and other ancillary electrical requirements.

The metal ion oxidant can also be regenerated using a solid oxidant. For example, a potential regeneration method involves mixing the sorbent in a batch mode with an oxidizing solid, or passing the sorbent solution through a packed bed containing an oxidizing solid. The solid would reoxidize the metal ion, e.g., iron, that is reduced to an inactive form over time. Sufficient capacity of solid oxidant would be provided such that it could also be regenerated at a central processing plant or mobile facility on the same schedule as the sorbent. In a specific embodiment, the solid oxidant MnO$_b$, which also neutralizes hydrogen ion, is used. The expected reaction mechanism is:

$$MnO_2+2H^++2FeCl_4^{-2}\rightarrow Mn(OH)_2(reduced)+2FeCl_4^-$$

Another potential oxidant, polyaniline (PA), could absorb hydrogen simultaneously with oxidation of the tetrachloroferrous ion, as shown below.

$$PA+2H^++2FeCl_4^-\rightarrow PA(reduced)+2FeCl_4^-$$

The Mn(OH)$_2$ or oxidized form of polyaniline could be periodically reoxidized, e.g., by an air treatment. The inorganic oxidant can also be regenerated by treating the sorbent solution with another oxidant, such as hydrogen peroxide (H$_2$O$_2$). For example, addition of H$_2$O$_2$ in an amount approximately equal to two times the stoichiometric amount of Fe$^{2+}$ can quantitatively regenerate ferric ion from reduced ferrous ion after oxidation of H$_2$S. Preferably, the H$_2$O$_2$ is added in concentrated form to avoid introduction of water. Preferably, the concentration of H$_2$O$_2$ added to the sorbent solution is greater than 30%, more preferably greater than or equal to about 50%, and more preferably still greater than or equal to about 70%, which is the highest concentration that is commercially available. One drawback of the introduction of H$_2$O$_2$ is that acid from the H$_2$S absorption is not completely neutralized.

The present invention provides for the reduction in the acidity of the sorbent solution. The net increase in acidity associated with the process is to add a base to the sorbent. One way is to add a base to neutralize the acidity. A possible candidate base for this method is ammonia, which would be cheap, relatively easy to add as a gas, and would not add any water to the system. Another possibility is that sufficient amine could be added to the original sorbent as a buffer to absorb the acidity as it is formed. In specific examples, but not by way of limitation, the base can be tetrabutyl ammonium carbonate (TBACO$_3$), tetramethylammonium bicarbonate (TMAHCO$_3$), monoethanolamine (MEDA) and the like.

The counter-ion chosen, and its concentration, can affect the efficiency of the system. In particular, the counter-ion can increase the overall basicity, or donor number, of the solution. For example, the chloride content of the iron/DMSO liquid redox reagent affects the course of polysulfide formation. High levels of chloride may make the solution even more "basic" than DMSO alone, and thus favor long polysulfide chains. This observation is based on measurements of the stoichiometry of reaction of tetrachloroferrate with sulfide. At low chloride concentrations the stoichiometric ratio is close to 1, indicating formation of short polysulfide chains. At high chloride concentrations the ratio approaches 2, indicating that long polysulfide chains are formed.

The invention can be better understood by referring to the following examples, which are provided merely by way of exemplification and are not intended to limit the invention.

EXAMPLE 1: OXIDATION OF H$_2$S BY Fe$^{3+}$ IN DMSO

This example demonstrates the use of a nonaqueous solvent, dimethyl sulfoxide (DMSO), as a base for the new H$_2$S scavenging process. DMSO is known to have a high solubility for polysulfide, and supports several iron-based redox agents. The results demonstrated that iron-based redox agents in DMSO provide excellent removal of H$_2$S and that the redox agent contributes greatly to both the removal efficiency and capacity of the sorbent. As expected, the capacity of sorbent for H$_2$S was limited by the solubility of the redox agent, indicating that regeneration by reoxidation would be needed. Buildup of acidity also decreased the sorption capacity, emphasizing that the regeneration process would also have to remove or neutralize acid buildup. Excellent removal of H$_2$S was observed for DMSO solutions containing Fe(III). Tests were done with relatively high concentrations of H$_2$S at atmospheric pressure to simulate the partial pressure of H$_2$S found at pipeline pressures. Tests done using 0.1M FeCl$_4^-$ in DMSO with either 500 or 4900 ppm H$_2$S (corresponding to approximately 8–80 ppm equivalent at 900 psi) showed removals of 96% or better at atmospheric pressure, corresponding to sub-ppm levels at pipeline pressure. These removals were obtained at gas residence times of 12 seconds or less. The residence time used in conventional scavenging vessels is considerably longer (approximately 50 seconds).

Figure 4:
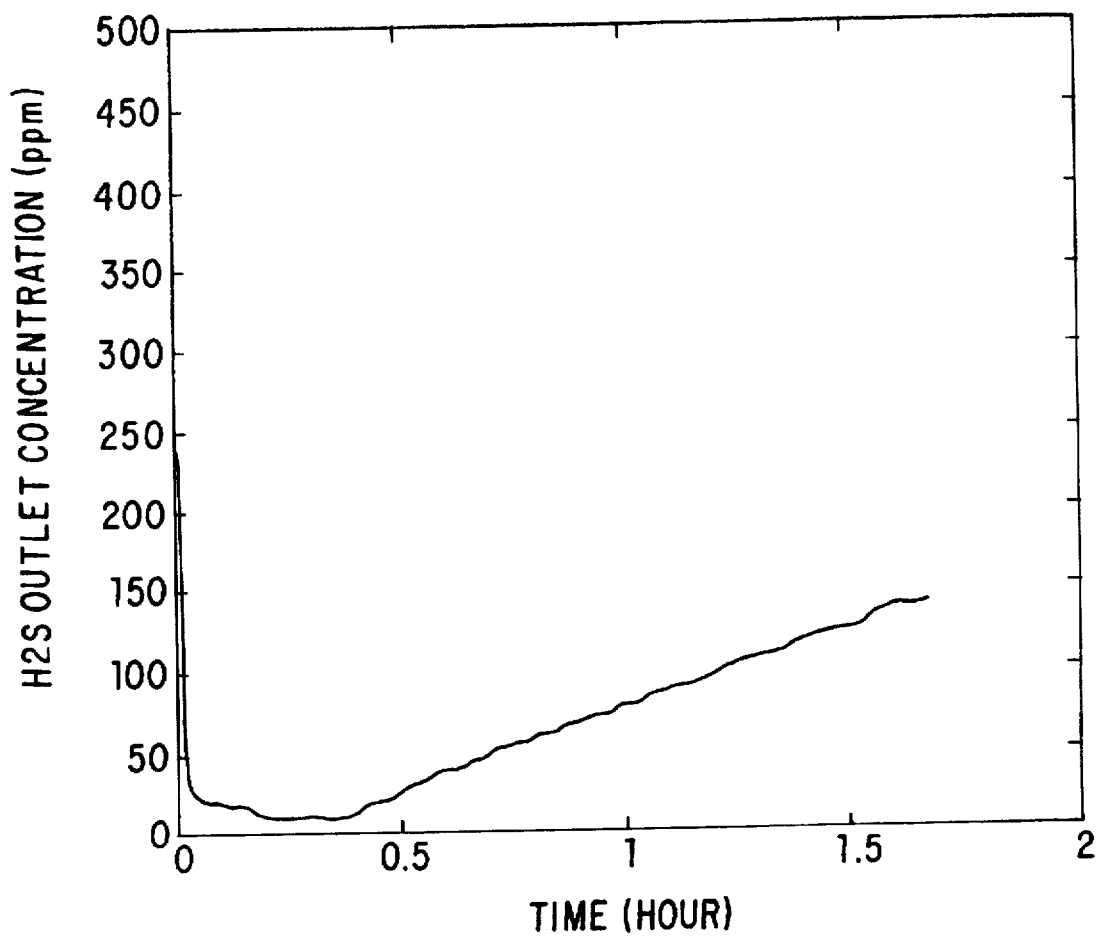
FIG. 4 depicts the removal of $H_2S$ using a solution of 0.1M Fe(III) in DMSO. The gas was fed into the solution at a rate of 300 ml/min and contained 500 ppm $H_2S$ at the inlet.

The removal of H$_2$S degrades with time, as shown in FIG. 4. This appears to be due to the buildup of hydrogen ion in the solution which probably leads to $H_2S$ "back-pressure" and reduced mass transfer. The solution capacity can be extended by adding a base such as monoethanolamine (MDEA) to the DMSO solution along with the $FeCl_4^-$.

Figure 5:
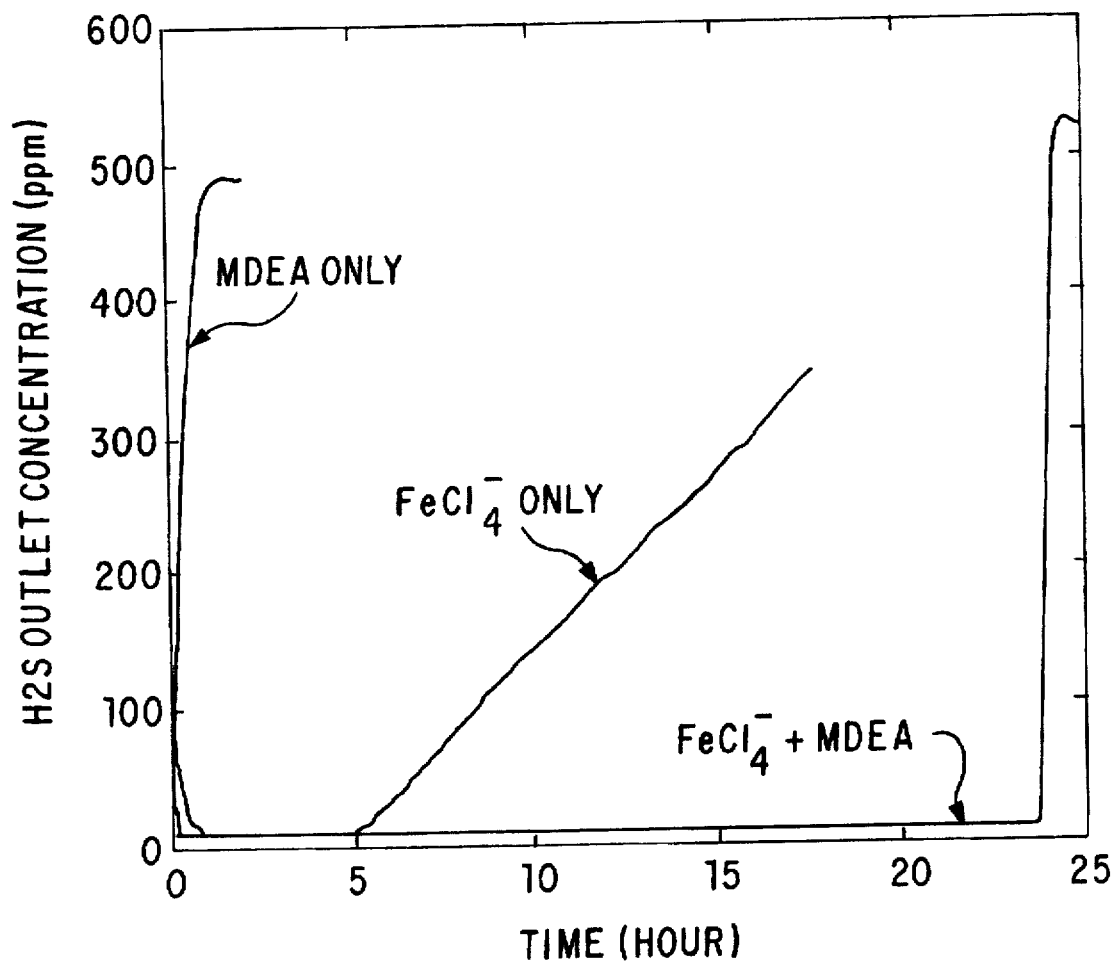
FIG. 5 depicts the removal of $H_2S$ using various DMSO sorbent solutions: a solution containing 0.5M monoethanoloamine (MDEA) base only; a solution containing 0.5M Fe(III)$Cl_4^-$ only; and a solution containing 0.5M $FeCl_4^-$ and 0.5M MDEA. The gas flow rate was 300 ml/min and contained 525 ppm of $H_2S$ at the inlet.

Comparisons of $H_2S$ removal obtained using 0.5M $FeCl_4^-$/DMSO with the removal of $H_2S$ by pure DMSO and by the MDEA/DMSO alone are shown in FIG. 5. As can be seen, the sulfur capacity of the solution using both the iron compound and the MDEA is much better than that using 0.5 $FeCl_4^-$ alone. As also shown in the figure, a solution containing only MDEA and DMSO has very little capacity for $H_2S$ compared to the iron-based sorbent. The hydrogen ion concentration where performance starts to degrade varies from about 0.04M $H^+$ for 0.1M initial Fe(III) to 0.09M $H^+$ for 0.5M initial Fe(III).

When the MDEA is present, 80% of the redox agent is utilized before breakthrough occurs. Thus if the iron concentration could be made sufficiently high, it would be possible to operate the system without redox agent regeneration. Since chloride ion was a major solubilizing agent for the Fe(III) cation in this system, high concentrations of chloride were used in an attempt to increase iron solubility. Although several chloride levels and counter-ions were tried (LiCl, tetramethylammonium chloride, tetraethylammonium chloride), no stable solutions containing more than about 1M Fe(III), with up to 3M chloride were obtained. Even with supplementary amine bases, the capacity of such solutions would be limited to approximately 0.5M total sulfur due to depletion of Fe(III). In order to improve on the sulfur capacity of the system compared to commercial scavengers, which have several times this sulfur capacity, methods for regenerating the Fe(III) from Fe(II) and simultaneously neutralizing the acidity formed on sorption of $H_2S$ were developed. Several methods for regeneration of Fe(III) were tested. These are described below, starting with the most promising method, in-scrubber electrochemical regeneration.

EXAMPLE 2: LIQUID REDOX SCRUBBING OF $H_2S$ IN DMSO WITH IN SITU ELECTROCHEMICAL REGENERATION OF THE OXIDANT

A regeneration scheme based on electrochemical regeneration inside the absorber was tested and found to have considerable promise. This method does not require a pump-around loop or external source of chemicals. Regeneration of the redox couple was demonstrated with this system, and sulfur capacity approaching current commercial levels was also demonstrated. Recovery of sulfur from the sorbent was also shown to be feasible. Fully developed sorbent systems of this type have the potential for significantly higher sulfur capacities than existing systems as well as being regenerable. The in situ, or in-scrubber, electrochemical regeneration method places the electrode used to reoxidize the redox couple (the anode) in the same vessel used to treat the gas. The preferred anode material is graphite, partly because of its low cost but primarily because graphite is a very poor material for electrochemical oxidation of sulfide or polysulfide (Hodes et al., 1980, J. Electrochem. Soc. 127:544). This lack of electrocatalytic activity for sulfur species is favorable since it suppresses the sulfur species reactions which could otherwise interfere with the desired electrochemical reaction, oxidation of the redox couple. The cathode should be placed in a separate compartment to avoid inefficiency arising from reduction of the newly oxidized redox couple on the cathode. A simple separator can be used between the scrubber and the anode compartment; a membrane material is not needed. The cathode compartment was operated with an aqueous or semi-aqueous solvent such that the main reaction was the generation of hydrogen. In scrubbing sour natural gas, it may be advantageous to combine the gas space of the anode and cathode compartments such that the hydrogen is simply added to the natural gas stream as it is evolved. A schematic of this design is shown in FIG. 1.

The reactions that are expected to occur with in situ electrochemical regeneration, assuming formation of an $S_9^{-2}$ polysulfide species using Ox as a general oxidant (oxidizing agent) and $R^-$ as the corresponding reduced form of the redox couple follow:

$$9H_2S(g) \rightarrow 9H_2S(l) \text{ (scrubber)}$$

$$9H_2S(l) + 16Ox \rightarrow S_9^{-2} + 16R^- + 18H^+ \text{ (scrubber)}$$

$$16R^- \rightarrow 16Ox + 16e^- \text{ (anode)}$$

$$16H^+ + 16e^- \rightarrow 8H_2 \text{ (cathode)}$$

Overall:

$$9H_2S(g) \rightarrow S_9^{-2} + 8H_2 + 2H^+$$

As shown by the overall reaction, there is a net production of hydrogen ion when polysulfide is the product instead of sulfur. This was demonstrated during the hydrogen peroxide regeneration tests discussed below.

In-scrubber regeneration with Fe(III)HEDTA/DMSO

The best results obtained used a sorbent containing 0.067M $Fe(ClO_4)_3$, 0.10M HEDTA (N-(2-hydroxyethyl) ethylenediamine-N,N',N'-triacetate), and 2.0M tetramethylammonium bicarbonate ($TMAHCO_3$) in DMSO. The $TMAHCO_3$ served to buffer the solution and was prepared by carbonation of a tetramethylammonium hydroxide solution in DMSO with pure $CO_2$. Two 0.635 cm diameter graphite rods having a total surface area of 8 $cm^2$ were used as the anode. The cathode was a platinum gauze contained in a compartment separated from the scrubber compartment by a medium porosity glass frit. The cathode compartment was filled with an aqueous solution containing 0.3M HEDTA and 2.0M $KHCO_3$. The anode potential was initially set at −0.1 V vs SCE (saturated calomel electrode), but was increased to +0.3 V vs SCE two hours after the start and maintained at that potential during the remainder of the run.

Figure 6A:
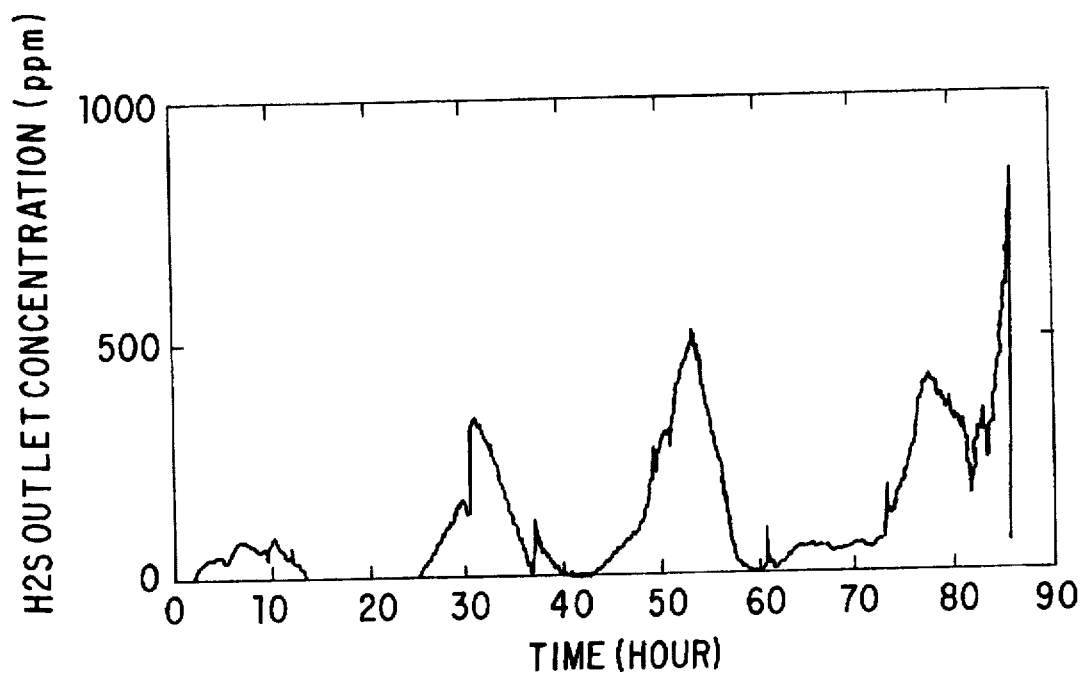
FIG. 6 depicts the removal of $H_2S$ using a sorbent containing 0.067M Fe($ClO_4$)$_3$, 0.01M N-(2-hydroxyethyl) ethylenediamine-N,N',N'-triacetate (HEDTA) and 2.0M tetramethylammonium bicarbonate (TMAHCO$_3$) in DMSO with in situ, or in scrubber, electrochemical regeneration of the $Fe^{3+}$ ion. (A) The $H_2S$ concentration at the outlet as a function of time. (B) The current drawn by the cell in the sorbent chamber as a function of time. The nominal gas flow rate was 141 ml/min, which was reduced to 80 ml/min during the period from 13 to 25 hours; the gas contained 4880 ppm $H_2S$.
Figure 6B:
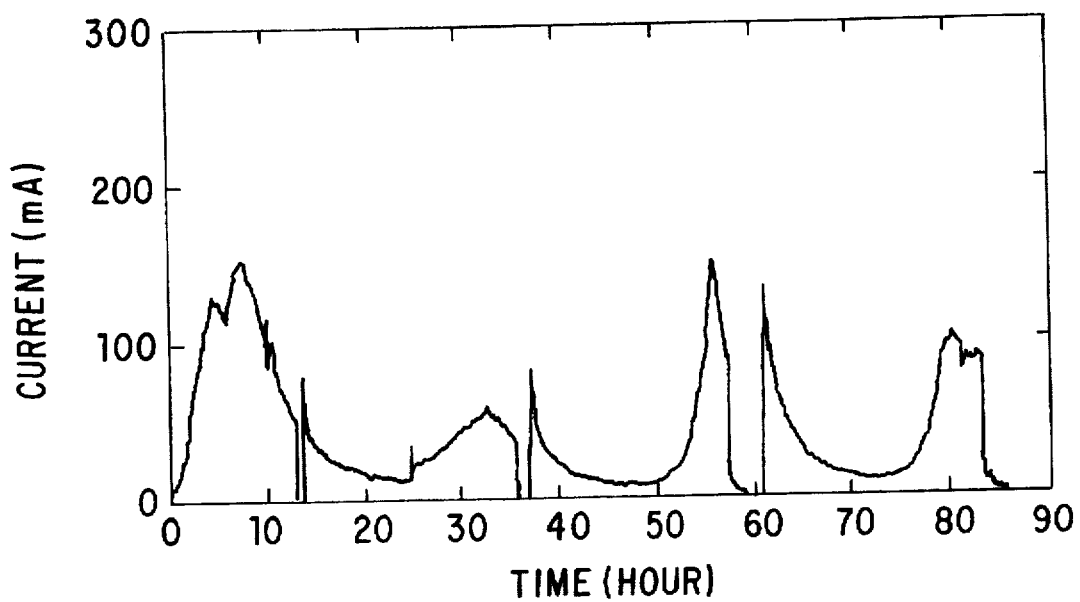

Plots of the current drawn by the cell as a function of run time and the $H_2S$ out of the cell also as a function of run time are shown in FIG. 6. The mean $H_2S$ removal during the run was 97.5%. The mean current during the run was 40.3 mA. Note that the current increases at several points when the outlet $H_2S$ started to rise. This increase occurred "automatically" under control of the potentiostat and in several instances was able to generate enough oxidized iron to bring the $H_2S$ outlet concentration back down.

Some problems were encountered with gelling of the cathode electrolyte and/or high resistance at the frit. When this happened, the potentiostat could not force enough current through the cell. The $H_2S$ flow was reduced from its nominal value of 141 ml/min to 80 ml/min during the period from 13 to 25 hour in order to compensate for this problem.

The total charge passed during the run was $1.24 \times 10^4$ coulombs, obtained by integration of the current/time curve. Using the total amount of sulfur in solution, the ratio of current efficiency (e) to number of electrons transferred per mole of sulfide oxidized (n) is 0.58. Although these two quantities cannot be determined independently, if formation Of $S_4^{-2}$ polysulfide is assumed, then n=1.5 and the corresponding current efficiency is 86%.

At the end of this run, the solution was a dark black in color, but no sulfur or other solids were visible. Both the initial and final volume of the scrubber solution was 50 ml. After the run a filtered sample of the solution was analyzed for total sulfur and found to contain 1.48M, or 0.074 total mole S. Based on the gas phase analyses, the total $H_2S$ fed to the cell was $8.50 \times 10^{-2}$ gmole and the total outlet $H_2S$ was $2.40 \times 10^{-3}$ gmole, giving 0.0826 gmole S absorbed and a sulfur mass balance recovery of 90%.

It is noteworthy that the redox couple had a turnover ratio of approximately 45 in this run; that is, the sorbent absorbed 45 times more $H_2S$ using electrochemical regeneration than it could have absorbed based on its original Fe(III) concentration.

It was found that solid sulfur can be precipitated from the black solution by addition of acid or water. For example, 0.50 ml of concentrated sulfuric acid was added slowly to 10 ml of the spent scrubbing solution while stirring with a magnetic stiffer. At the end of this addition, the black color had disappeared and a voluminous yellow solid had formed. The filtrate from this mixture was a clear yellow solution. The precipitated sulfur weighed 0.58 g, representing a 120% recovery based on the measured total sulfur content of the solution. The pH decreased from 12.8 to 5.4 on addition of the acid. Precipitation of the sulfur as $S_8$ is presumed to be due to the disproportionation of a polysulfide to form sulfur and bisulfide, a reaction which requires hydrogen ion.

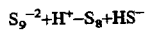

$$S_9^{-2} + H^+ \rightarrow S_8 + HS^-$$

Oxidation of the bisulfide byproduct by residual redox couple could explain the nearly 100% recovery of sulfur. The effects of adding water to the spent scrubber liquid were determined to obtain more information on the tolerance of the solution for water as well as on the sulfur precipitation process. A 7.5 ml aliquot of the solution was place in a small beaker and stirred with a magnetic stirrer. Water was added first in 0.50 ml portions, then in 1.00 ml portions. No visible change in the solution occurred on addition of the first 5.5 ml of water (42% (v/v) water added). Other than production of a somewhat lighter color due to dilution, the solution remained clear. Addition of another 1.0 ml portion of water (6.50 ml total added) produced a sudden change to a turbid solution and produced what appeared to be sulfur floating on top of the solution, which ultimately sank to form a thin layer on the bottom of the beaker. One more 1.0 ml aliquot of water was added without apparent effect. The pH of the liquid was 10.8 at this point. The solution was filtered and the solid material obtained. The water content of the starting solution was not known, but it may have been as high as 20% (wt/v) based on the water content of the starting reagents. Thus, the solution can tolerate at least 40%, and perhaps as much as 55%, water without formation of solid sulfur. The tolerance of the solution to carbon dioxide was also evaluated. No $CO_2$ was used in the sorption tests, but this gas may be present in natural gas streams. Since the formation of sulfur is pH dependent, tolerance of the system for $CO_2$ must be considered. Some qualitative information was obtained by taking a 10 ml aliquot of the spent scrubber solution and bubbling pure $CO_2$ through it. After 24 hours of treatment, the pH had decreased by 2.5 pH units, but there was no apparent reaction or sulfur formation. This indicates that the system has considerable tolerance for acidification by $CO_2$.

In-scrubber Regeneration with $Fe(NO_3)_3$/DMSO

Figure 7A:
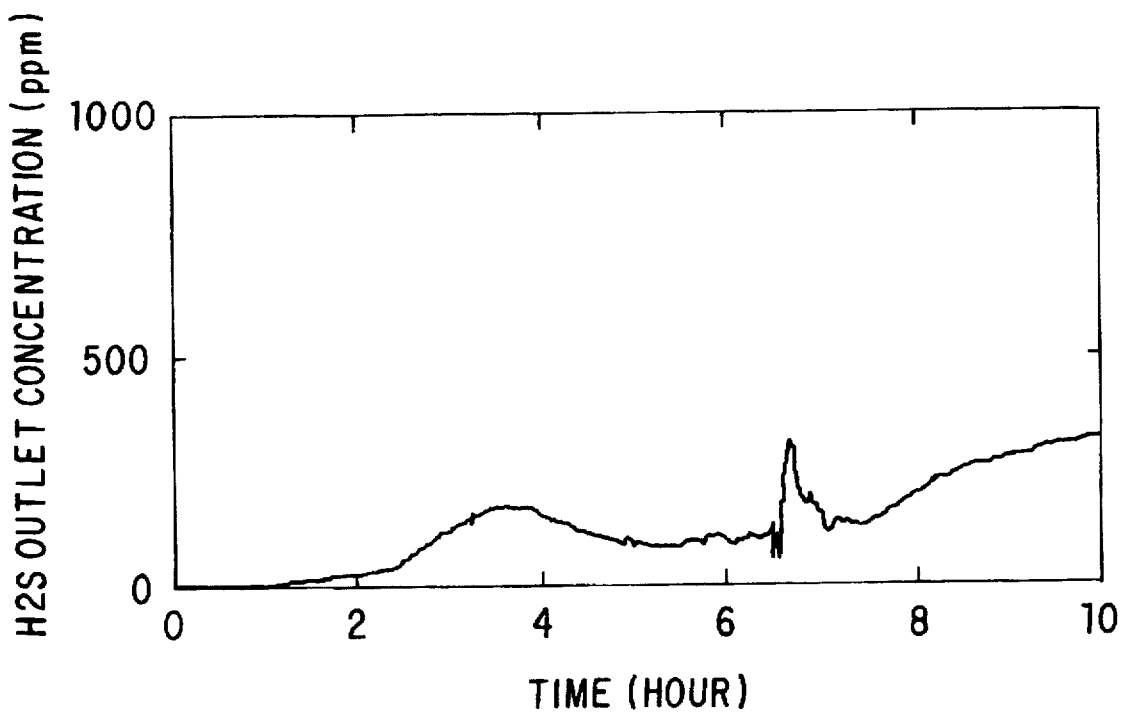
FIG. 7 depicts the removal of $H_2S$ using a sorbent containing 0.05M Fe(NO$_3$)$_3$ and 3.0M TMAHCO$_3$ in DMSO with in situ electrochemical regeneration. (A) The $H_2S$ concentration at the outlet as a function of time. (B) The current drawn by the cell in the sorbent chamber as a function of time. The nominal gas flow rate was 141 ml/min, which was reduced to 80 ml/min during the period from 13 to 25 hours; the gas contained 4880 ppm $H_2S$.
Figure 7B:
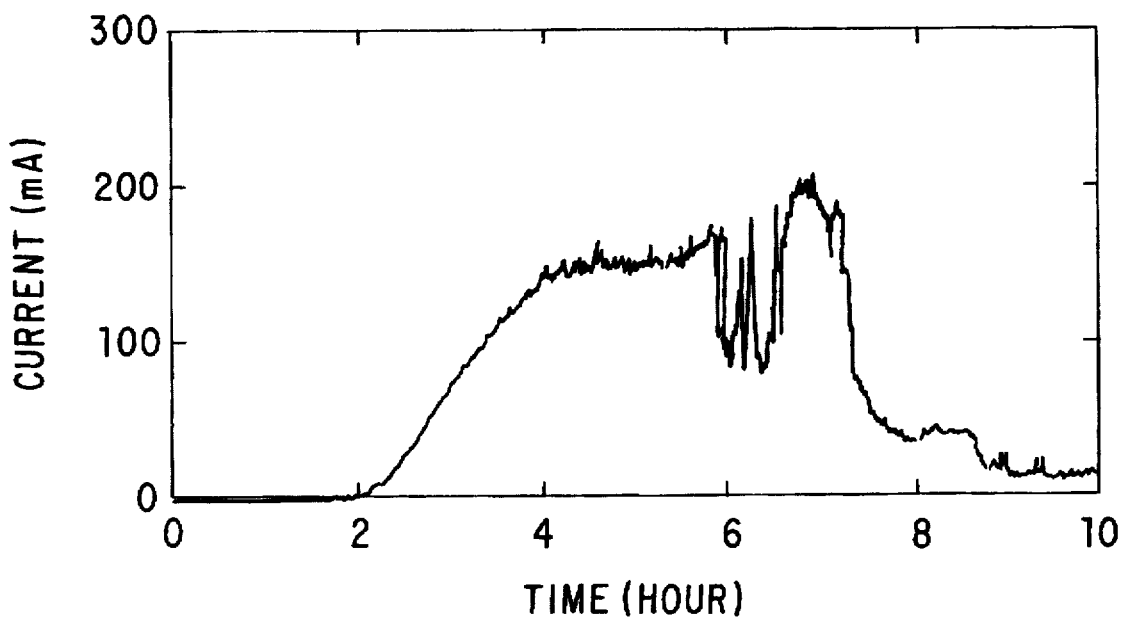

Results were obtained using a sorbent containing 0.05M $Fe(NO_3)_3$ and 3.0M $TMAHCO_3$ in DMSO. No chelating agent was used in this case. The cell/scrubber was set up as described in the previous example, except that the cathode compartment contained 3.0M $TMAHCO_3$ in DMSO. The anode potential was held at +0.50 V vs SCE during the run. Plots of the current drawn by the cell as a function of run time and the $H_2S$ out of the cell also as a function of run time are shown in FIG. 7. As can be seen, the current rose smoothly as the $H_2S$ concentration increased, and started to reach a steady value. At about 6 hours run time, however, problems with a high resistance in the cell developed, and the potentiostat finally was not able to pass enough current to maintain $H_2S$ removal.

The high resistance appeared to be associated with the glass frit between the cathode compartment and the scrubber compartment/anode. This may be due to precipitation of iron hydroxide in the frit. Some gelling of the cathode electrolyte and sticking of the Pt gauze cathode to the frit was observed.

This solution turned black during the run and there was no apparent sulfur formation. The total sulfur measured in a filtered sample from this solution was 0.39M, or 0.0195 gmole. From the gas phase measurements, the total inlet $H_2S$ was $1.78 \times 10^{-2}$ gmole and the total $H_2S$ out was $4.81 \times 10^{-4}$ gmole, giving 0.0173 gmole $H_2S$ absorbed and a sulfur recovery of 112%.

A run was also attempted using a similar electrochemical setup and 0.10M tetraethylammonium $FeCl_4$ in DMSO. This sorbent solution also removed $H_2S$ and was regenerated. However, high resistance problems were encountered during this run and it was aborted.

EXAMPLE 3: LIQUID REDOX SCRUBBING OF $H_2S$ IN DMSO WITH $H_2O_2$ REGENERATION OF THE OXIDANT

The feasibility of regenerating $FeCl_4^-$/DMSO solutions by injection of hydrogen peroxide was initially tested batchwise by reacting a 0.1M solution of ferric chloride in DMSO with $H_2S$ gas. Addition of the stoichiometric amount of $H_2S$ (using a 5.0% $H_2S$ gas mixture) gave complete reaction of $Fe^{3+}$ and a clear yellow solution (no solid sulfur was formed). Small aliquots of $H_2O_2$ (30% solution) were added to this solution while monitoring the pH and the amount of $Fe^{2+}$ in the liquid. It was found that the $Fe^{3+}$ could be regenerated by adding approximately two times the stoichiometric amount of $H_2O_2$. The reaction appears to be rapid, occurring on the order of minutes or less. The pH of the liquid increases as $H_2O_2$ is added; however, it did not return to its initial value before $H_2S$ addition. The regenerated solution was able to absorb a second dose of $H_2S$.

The excess consumption of hydrogen peroxide is probability due to the decomposition of $H_2O_2$ by $Fe^{3+}$ which has received considerable study in aqueous solution. Nevertheless, even at the two fold excess the addition of $H_2O_2$ is relatively inexpensive, adding approximately 0.4 cent/MMBTU for a 20 ppm $H_2S$ stream. This cost is based on use of 50% $H_2O_2$ in 55 gallon drum lots. It is desirable to use a concentrated source of hydrogen peroxide for sorbent regeneration to avoid adding water to the sorbent. A source of 70% hydrogen peroxide (Solvay Interox) provides this concentration as the highest concentration commercially available.

Addition of $H_2O_2$ to the reduced solution produced a transient deep red/violet color and ultimately a very dark red solution when the reaction was complete. This color was destroyed by subsequent addition of $H_2S$.

An initial run was done using continuous addition of 30% $H_2O_2$ while absorbing $H_2S$ from a 5.0% $H_2S$ gas stream into 0.1M FeCl$_4^-$/DMSO. Approximately 0.9M equivalent of H$_2$S was passed into the solution without formation of solid sulfur. However, it is not certain that all of the H$_2$S was absorbed since H$_2$S gas analysis was not being done at this time. At the end of the run, it was noted that the pH had decreased to a low value.

Later runs were done with continuous monitoring of pH and the redox potential (Pt electrode) along with continuous addition of H$_2$S and H$_2$O$_2$. It was found that the pH decreased even when the H$_2$O$_2$ flow was sufficient to regenerate the Fe$^{3+}$ as measured by the redox potential. This could be due to the incomplete oxidation process, i.e., the overall reaction (catalyzed by FeCl$_4^-$) being as follows:

$$8H_2S + 7H_2O_2 \rightarrow S_8^{-2} + 14H_2O + 2H^+$$

or possibly involving longer chain polysulfides (with correspondingly lower amounts of H$^+$ produced).

Titration tests were done to compare the ph-time profile obtained on addition of known amounts of perchloric acid to the solution with those obtained from the H$_2$S/H$_2$O$_2$ runs. These results indicate that there is a net production of about 1 mole of H$^+$ for every 8 moles of H$_2$S absorbed.

A continuous run was done using 0.1M FeCl$_4^-$/DMSO and 5.0% H$_2$S. Sulfur formation was noted when the solution pH approached 1.0. An addition of 20 ml of 25% tetraethylammonium hydroxide was made to increase the pH. The H$_2$S addition was continued for 6.3 hours, during which time 34.7 ml of 30% H$_2$O$_2$ (0.34 gmole H$_2$O$_2$) was added to the solution. A total dissolved sulfur concentration of 0.55M (0.052 gmole S) was achieved, but 2.23 g sulfur (0.070 gmole S) precipitated. The two sulfur measurements accounted for 61% of the H$_2$S passed into the cell.

A sample of 70% hydrogen peroxide was obtained to see if the lower water content would produce less solid sulfur formation. Compatibility tests were done to determine the safety of use of the material with the sorbent. These tests were done by adding incrementally larger volumes of the hydrogen peroxide solution to test solutions while stirring the test solution in a beaker behind an explosion shield. No problems were encountered when adding 70% H$_2$O$_2$ to pure DMSO. However, after the second addition of the peroxide solution to a FeCl$_4^-$/DMSO solution, a delayed reaction occurred and the contents of the solution were expelled. This test represented an "overdose" and it is possible to control the addition of peroxide in scavenger use. However, it seems prudent to avoid this regeneration method in favor of other methods.

EXAMPLE 4: REGENERATION WITH MnO$_2$

Solid MnO$_2$ was tried as an alternative regeneration method. Batch studies indicated that MnO$_2$ could regenerate FeCl$_4^-$ from H$_2$S-reduced solutions and that this regeneration also neutralized the protons generated by sorption of H$_2$S.

Addition of 1.10 g of MnO$_2$ as a slurry (equivalent to 0.25M) to a solution of 0.1M FeCl$_4^-$/DMSO which had been reduced with H$_2$S to an Fe(II) concentration of 0.080M oxidized half of the Fe(II) to Fe(III) in 41 minutes. The remainder of the Fe(II) was converted overnight. The original pH of this solution was 5.9. The pH decreased to 2.0 with the addition of H$_2$S, but the MnO$_2$ regeneration caused an increase to 5.6 at the half/regeneration point, and a pH of 7.4 after the overnight stand. The reason for the pH being higher than the original solution is not known.

Figure 8:
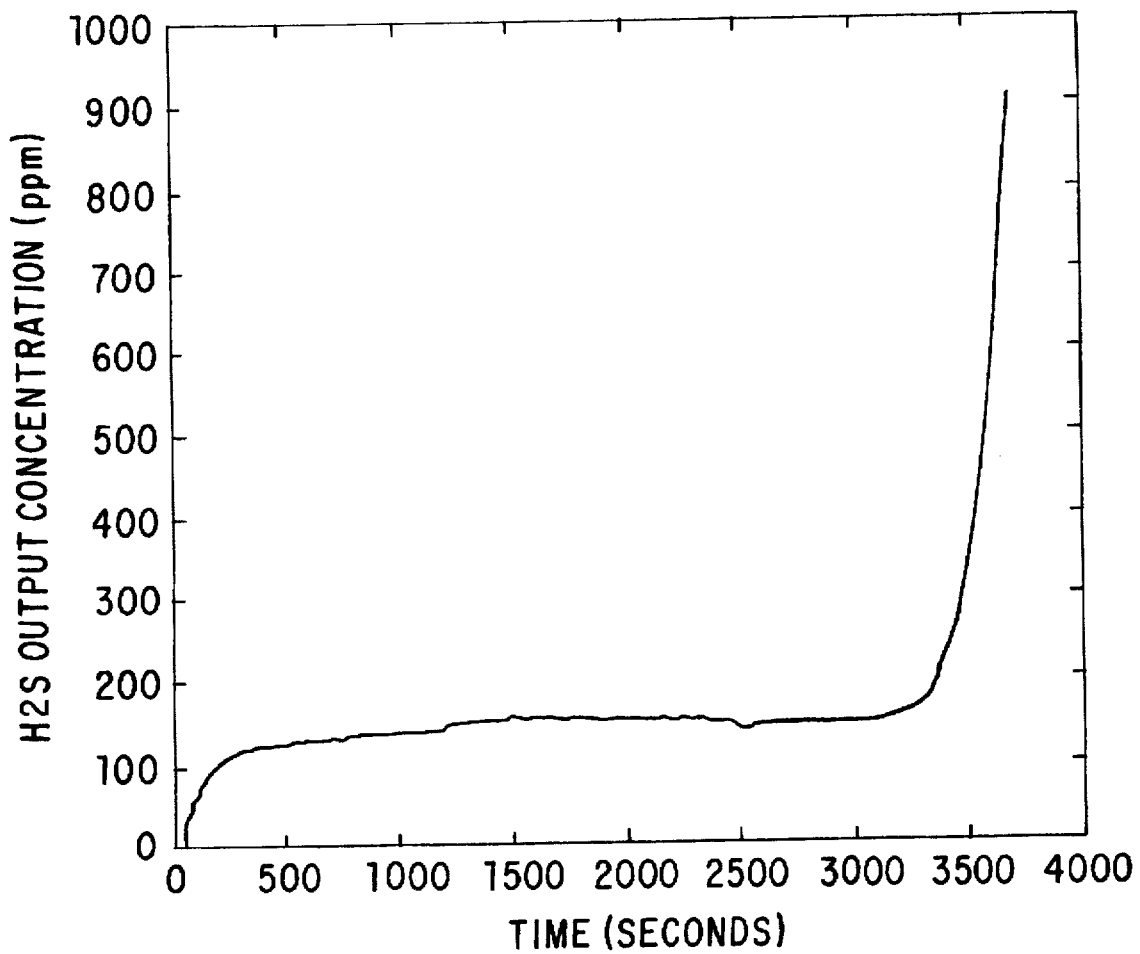
FIG. 8 depicts the removal of $H_2S$ from a sorbent solution containing 0.1M $FeCl_4^-$ in DMSO after regeneration of the $Fe^{3+}$ ion by addition of 0.25M $MnO_2$ in a batch mode. The inlet concentration of $H_2S$ was 4880 ppm.

Another dose of H$_2$S was added to this system after the batch regeneration (with the remaining MnO$_2$ still in the cell). The results shown in FIG. 8 indicate that the solution's capacity for H$_2$S has been restored, although the lowest removal is not as good as the original solution.

Figure 9:
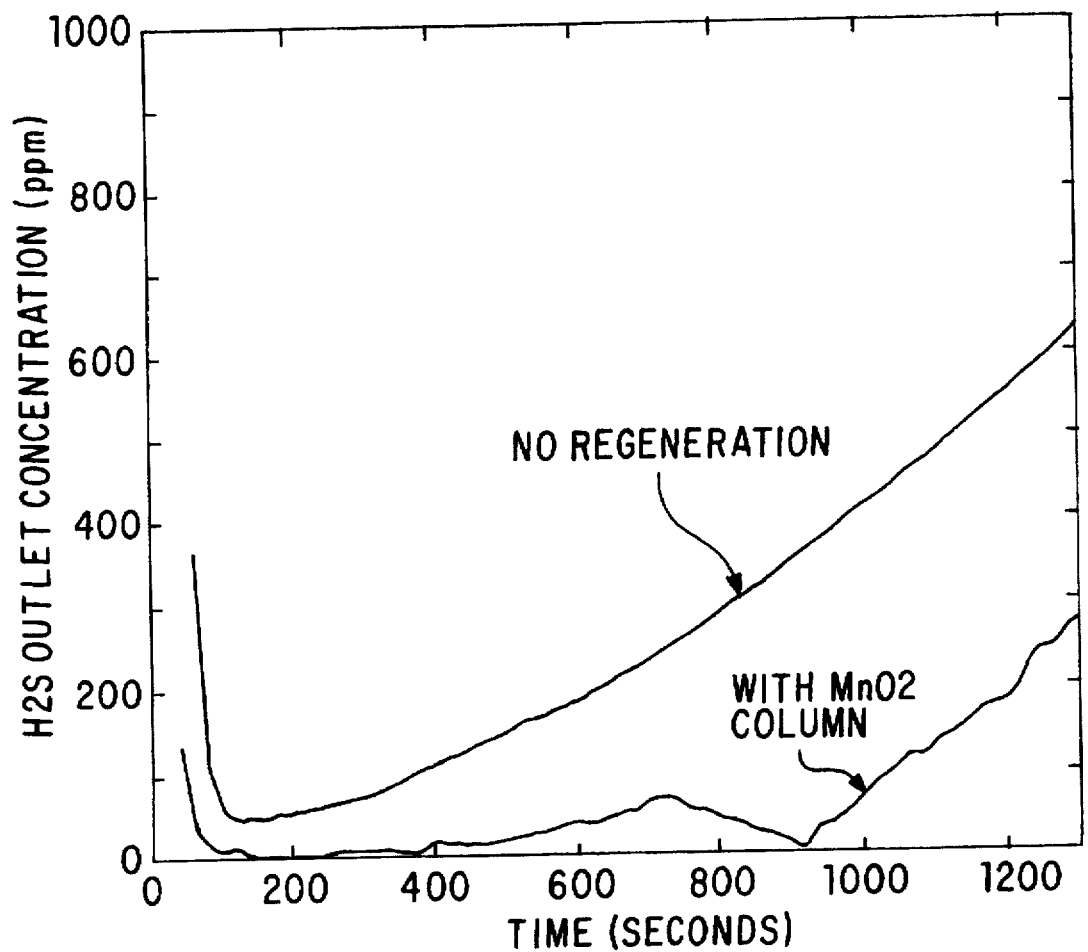
FIG. 9 depicts the removal of $H_2S$ from a sorbent solution containing 0.1M $FeCl_4^-$ in DMSO after regeneration of the $Fe^{3+}$ ion by continuously running the solvent through a $MnO_2$ column, compared to a sorbent solution which is not regenerated. The gas flow was 250 ml/min, with a concentration of 4880 ppm of $H_2S$ at the inlet.

A run was done with a continuous flow through a tubular column filled with 9 cm' (15.4 g, approximately 20% of the volume of the absorber vessel) of powdered MnO$_2$. The 0.1M FeCl$_4^-$/DMSO solution was pumped through this column at 2 ml/min while being contacted with 4880 ppm H$_2$S at 250 ml/min. Although some regeneration was obtained, this arrangement was not able to maintain a sufficiently high FeCl$_4^-$ concentration to treat this flow rate of H$_2$S. Results of this run are shown in FIG. 9 along with the comparison run without regeneration.

Regeneration would be expected to be satisfactory using a larger amount of MnO$_2$ and increasing the exposure of the spent sorbent to the re-oxidant.

EXAMPLE 5: EXTERNAL MEMBRANE CELL REGENERATION

Tests were done to determine if an ElectroCell MP electrochemical flow cell equipped with a NAFION cation-selective membrane could regenerate Fe(III) from Fe(II) in DMSO and control the hydrogen ion buildup which occurs during H$_2$S scavenging. Reduced Fe/DMSO solutions were prepared by adding known amounts of pure H$_2$S to Fe(III) /DMSO solution. These solutions were then electrolyzed (on the anode side of the cell) in batch mode and the Fe(II) concentration was determined periodically. An aerated DMSO solution containing the same concentration (1.5M) of LiCl was circulated on the cathode side during the electrolysis.

Figure 10:
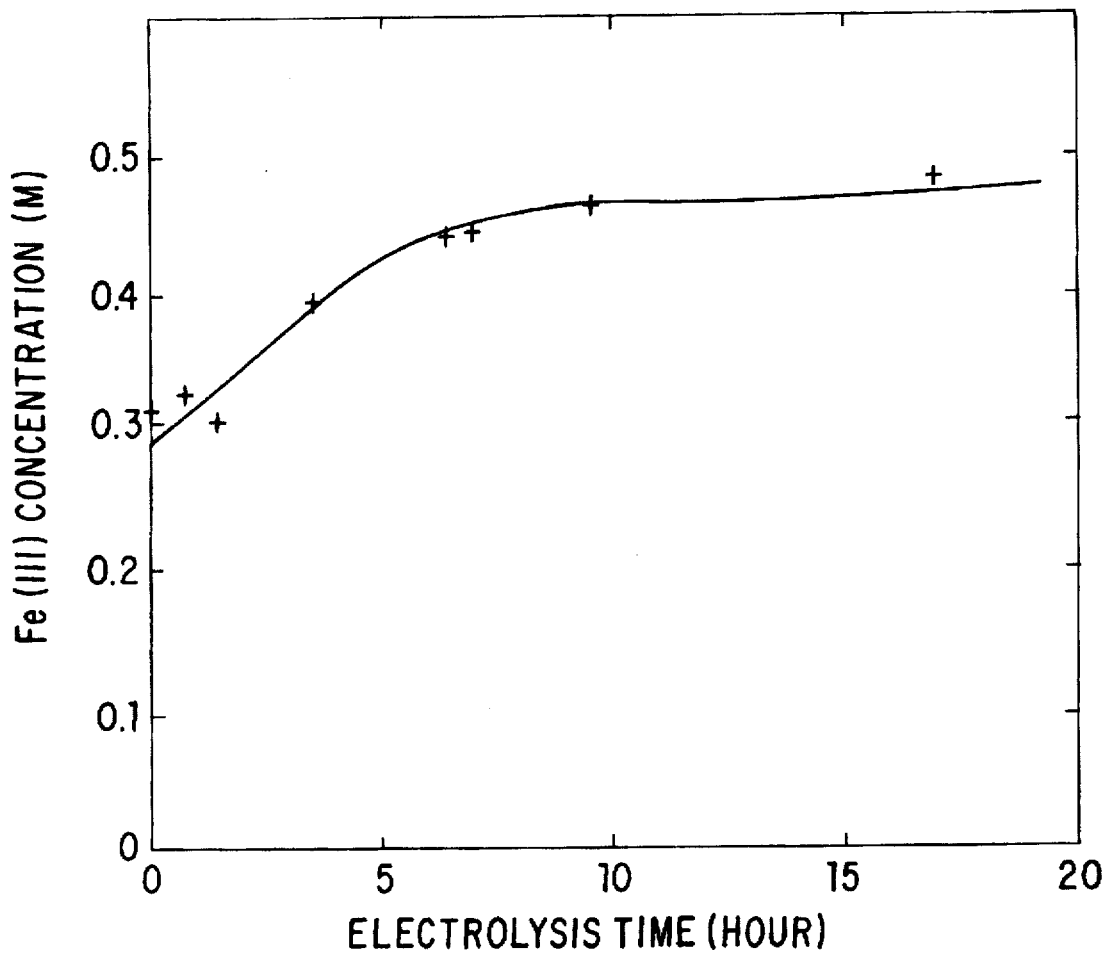
FIG. 10 depicts the electrochemical regeneration of Fe(III) from Fe(II) in an external cell.

Regeneration of Fe(III) from Fe(II) was demonstrated, as shown in FIG. 10. The slope of the curve in the first seven hours of the run gave a current efficiency of 56%. The current efficiency then decreased as the concentration of Fe(II) became small.

Several problems were encountered during these tests. There was a significant transfer of liquid from the anode side to the cathode side of the cell during electrolysis. The cause of this was not determined but could be an electroosmotic effect, and thus correctable.

Problems also occurred with ion transfer across the NAFION membrane. The pH of the anode solution did not increase as it should if hydrogen ion was being transferred to the cathode side, but instead showed a steady decrease. Thus the cell was not able to neutralize the acidity resulting from sorption of H$_2$S. Furthermore, there was a distinct change in color of the cathode solution that may have been due to transfer of iron through the membrane since 0.010M Fe was found on the cathode side after one run. Selection of a different cation selective membrane could overcome this problem.

Finally, cell voltages were higher than expected at approximately 5.5 V, and current efficiencies for Fe(III) regeneration were rather low (near 50%). The external cell electrochemical regeneration system, although effective, requires additional development to achieve the results with in situ electrochemical regeneration. Nevertheless, the problems with this system could be solved.

The present invention is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims. Various publications are cited herein, the disclosures of which are incorporated by reference in their entireties.

What is claimed is:

1. A method for removing hydrogen sulfide from a gaseous stream comprising:
   a. contacting a gaseous stream containing hydrogen sulfide with a sorbent solution comprising a substantially non-aqueous solvent having a low vapor pressure and a high electron donor number, a concentration of a polyvalent reducible metal ion in an oxidative state sufficient to oxidize the hydrogen sulfide, and at least one counter-ion for the metal ion, wherein said contacting step results in the formation of at least one soluble sulfur compound without forming elemental sulfur; and
   b. regenerating the oxidative state of the metal ion reduced by the hydrogen sulfide, said at least one soluble sulfur compound remaining soluble during and subsequent to said metal regeneration.

2. The method according to claim 1 wherein the gaseous stream contains less than 50 parts per million of hydrogen sulfide.

3. The method according to claim 1 wherein the non-aqueous solvent is dimethylsulfoxide.

4. The method according to claim 1 wherein the metal ion is selected from the group consisting of iron, manganese, copper, cobalt, and vanadium.

5. The method according to claim 1 wherein the metal ion is iron.

6. The method according to claim 1 wherein the counter-ion is an ion selected from the group consisting of chloride and nitrate.

7. The method according to claim 1 wherein hydrogen is removed from the sorbent solution concurrently with the regeneration of the oxidative state of the metal ion.

8. The method according to claim 1 wherein the gaseous stream is natural gas.

9. The method according to claim 1 wherein said sorbent solution further comprises a chelating group.

10. The method according to claim 9 wherein the chelating group is selected from the group consisting of ethylenediamine-N,N,N',N'-tetraacetate, diethylenetriaminepentaacetate, N-(2-hydroxyethyl)ethylenediamine-N,N',N'-triacetate, ethylene bis(oxyethylenenitrilo) tetraacetate, trans-1,2-cyclohexanediaminetetraacetate, and nitrilotriacetic acid.

11. The method according to claim 1 wherein the oxidative state of the metal ion is regenerated by electrolysis.

12. The method according to claim 11 wherein the electrolysis is conducted in situ.

13. The method according to claim 1 wherein the oxidative state of the metal ion is regenerated by chemical oxidation.

14. The method according to claim 13 wherein the chemical oxidation is effected by treatment with a 2:1 stoichiometric ratio of concentrated hydrogen peroxide to reduced metal ion.

15. The method according to claim 1 wherein the oxidative state of the metal ion is regenerated by contacting the sorbent solution with an oxidizing solid.

16. The method according to claim 15 wherein the oxidizing solid is selected from the group consisting of $MnO_2$ and polyaniline.

17. An apparatus for removing hydrogen sulfide from a gaseous stream comprising:

a vessel containing a sorbent solution, said sorbent solution comprising a substantially non-aqueous solvent having a low vapor pressure and a high electron donor number, a concentration of a polyvalent reducible metal ion in an oxidative state sufficient to oxidize hydrogen sulfide present in said gaseous stream to at least one soluble sulfur compound, and a counter-ion for the metal ion, which vessel substantially protects the sorbent solution from exposure to air;

means for contacting said gaseous stream with the sorbent solution in the vessel, contacting forming said at least one soluble sulfur compound without forming elemental sulfur; and means for regenerating the oxidative state of the metal ion reduced by the hydrogen sulfide, whereby said at least one soluble sulfur compound remains soluble during and subsequent to said regeneration.

18. The apparatus of claim 17 wherein the non-aqueous solvent is dimethylsulfoxide.

19. The apparatus of claim 17 wherein the metal ion is selected from the group consisting of iron, manganese, copper, cobalt, and vanadium.

20. The apparatus of claim 17 wherein the metal ion is iron.

21. The apparatus of claim 17 wherein the counter-ion is selected from the group consisting of chloride and nitrate.

22. The apparatus of claim 1 wherein the sorbent solution further comprises a chelating group.

23. The apparatus of claim 22 wherein the chelating group is selected from the group consisting of ethylenediamine-N,N,N',N'-tetraacetate, diethylenetriaminepentaacetate, N-(2-hydroxyethyl)ethylenediamine-N,N',N'-triacetate, ethylene bis(oxyethylenenitrilo) tetraacetate, trans-1,2-cyclohexanediaminetetraacetate, and nitrilotriacetic acid.

24. The apparatus of claim 17 wherein said means for regenerating the oxidative state of the metal ion is an electrochemical cell.

25. The apparatus of claim 24 wherein the electrochemical cell is located in situ.

26. The apparatus of claim 17 wherein said means for regenerating the oxidative state of the metal ion is a chemical oxidant.

27. The apparatus of claim 26 wherein the chemical oxidant is a 2:1 stoichiometric ratio of concentrated hydrogen peroxide to reduced metal ion.

28. The apparatus of claim 17 wherein said means for regenerating the oxidative state of the metal ion is an oxidizing solid in contact with the sorbent solution.

29. The apparatus of claim 28 wherein said oxidizing solid is selected from the group consisting of $MnO_2$ and polyaniline.

* * * * *